United States Patent
Otaka

(10) Patent No.: US 10,979,883 B2
(45) Date of Patent: Apr. 13, 2021

(54) RADIO COMMUNICATION SYSTEM WITH MOBILE STATION FUNCTIONING AS MOBILE BASE STATION UNDER EMERGENCY CONDITION

(71) Applicant: HONDA MOTOR CO., LTD., Tokyo (JP)

(72) Inventor: Masaru Otaka, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 37 days.

(21) Appl. No.: 16/451,603

(22) Filed: Jun. 25, 2019

(65) Prior Publication Data
US 2019/0394629 A1 Dec. 26, 2019

(30) Foreign Application Priority Data
Jun. 25, 2018 (JP) ................................ 2018-120240

(51) Int. Cl.
| | | |
|---|---|---|
| H04M 11/04 | (2006.01) | |
| H04W 4/02 | (2018.01) | |
| H04W 4/90 | (2018.01) | |
| H04W 48/06 | (2009.01) | |
| H04W 4/40 | (2018.01) | |
| H04W 48/04 | (2009.01) | |

(52) U.S. Cl.
CPC ............... *H04W 4/90* (2018.02); *H04W 4/40* (2018.02); *H04W 48/04* (2013.01); *H04W 48/06* (2013.01)

(58) Field of Classification Search
CPC ......... H04W 4/90; H04W 4/40; H04W 48/04; H04W 48/06

USPC ........................................................ 455/404.2
See application file for complete search history.

(56) References Cited

U.S. PATENT DOCUMENTS

| | | | |
|---|---|---|---|
| 9,060,293 B1* | 6/2015 | Vivanco | .............. H04W 52/262 |
| 2005/0108374 A1* | 5/2005 | Pierzga | .............. H04B 7/18504 |
| | | | 709/223 |

(Continued)

FOREIGN PATENT DOCUMENTS

| | | |
|---|---|---|
| CN | 105850187 A | 8/2016 |
| JP | 2015046690 A | 3/2015 |
| JP | 2016-100640 A | 5/2016 |

OTHER PUBLICATIONS

Office Action dated Nov. 14, 2020, issued in counterpart CN Application No. 201910515676.7, with English translation (14 pages).

*Primary Examiner* — Rafael Pérez-Gutiérrez
*Assistant Examiner* — Mark G. Pannell
(74) *Attorney, Agent, or Firm* — Westerman, Hattori, Daniels & Adrian, LLP

(57) ABSTRACT

In the event of an emergency, a base station in a radio communication system sends an SIB10 signal and an SIB11 signal to a plurality of mobile stations, and further sends the SIB10 signal and the SIB11 signal containing mobile-station high priority assignment information to predetermined one among the mobile stations. Upon receiving those signals, the predetermined mobile station executes sending and receiving of radio signals to and from the base station, and concurrently functions as a mobile base station that executes sending and receiving of radio signals between the predetermined mobile station and the other mobile stations located in the surroundings of the predetermined mobile station.

6 Claims, 5 Drawing Sheets

(56) References Cited

U.S. PATENT DOCUMENTS

| | | | | |
|---|---|---|---|---|
| 2011/0034145 | A1* | 2/2011 | Youn | H04W 4/90 |
| | | | | 455/404.1 |
| 2013/0040558 | A1* | 2/2013 | Kazmi | H04W 16/26 |
| | | | | 455/9 |
| 2015/0339718 | A1* | 11/2015 | Walton | G06Q 30/0261 |
| | | | | 705/14.16 |
| 2016/0198516 | A1* | 7/2016 | Kim | H04W 76/14 |
| | | | | 370/312 |
| 2016/0212653 | A1* | 7/2016 | Wang | A61B 10/0051 |
| 2019/0364510 | A1* | 11/2019 | Bonazzoli | H04W 52/0264 |
| 2019/0373579 | A1* | 12/2019 | Nord | H04W 8/005 |

* cited by examiner

RADIO COMMUNICATION SYSTEM WITH MOBILE STATION FUNCTIONING AS MOBILE BASE STATION UNDER EMERGENCY CONDITION

CROSS REFERENCES TO RELATED APPLICATIONS

The present application claims priority under 35 U.S.C. § 119 to Japanese Patent Application No. 2018-120240, filed Jun. 25, 2018, entitled "Radio Communication System." The contents of this application are incorporated herein by reference in their entirety.

TECHNICAL FIELD

The present disclosure relates a radio communication system in which, when an emergency has occurred and a predetermined condition has generated, radio communication between a base station and a plurality of mobile stations is more restricted than in an ordinary situation.

BACKGROUND

A radio communication system disclosed in Japanese Unexamined Patent Application Publication No. 2016-100640 is known so far. The disclosed radio communication system includes an information issuing server, a network, an information distribution server, an exchange station, a base station, and mobile stations. In the disclosed radio communication system, if an emergency alert is issued in the event of an emergency such as an earthquake or a tsunami, the emergency alert is sent from the information issuing server to the information distribution server via the network. Then, the emergency alert is sent from the information distribution server, via the exchange station and the base station, to all the mobile stations in a region where the emergency has occurred. Thus, users of the mobile stations in the region where the emergency has occurred can receive the emergency alert.

SUMMARY

In a general radio communication system, there is a possibility that, after the occurrence of an emergency, a traffic volume abruptly increases between mobile stations in a region where the emergency has occurred and both of mobile stations and fixed-line phones outside the region, and that line congestion generates. In the event of such line congestion, the mobile stations related to police and politics and given with high priority (hereinafter referred to as "high-priority mobile stations") can perform radio communication under the same conditions as those in an ordinary situation. However, the other general mobile stations come into a state in which radio communication except for emergency calls to fire and police stations is restricted, and ordinary radio communication cannot be performed (see FIG. 5 described later). This raises the problem that, after the occurrence of the emergency, communication from the general mobile stations for safety confirmation, risk avoidance, dispatch of information, etc. cannot be performed, and that convenience of the system is low.

In view of the above-described state of the art, it is desirable to provide a radio communication system that enables communication to be performed for safety confirmation, risk avoidance, dispatch of information, etc. after the occurrence of an emergency, and that ensures high convenience.

The present application describes a radio communication system including a base station and a plurality of mobile stations, the radio communication system operating such that radio signals are sent and received between the base station and the plurality of mobile stations in an ordinary situation, and that radio communication between the base station and the plurality of mobile stations is more restricted than in the ordinary situation when an emergency has occurred and a predetermined condition has generated, wherein, in the event of the emergency, the base station sends, to the plurality of mobile stations, an emergency radio signal (SIB10 signal or SIB11 signal) that contains emergency information (first notification information or second notification information) indicating the occurrence of the emergency, and further sends, to predetermined one among the plurality of mobile stations, an emergency cancellation radio signal containing cancellation information, which at least partly cancels restriction of the radio communication with the predetermined mobile station, in addition to the emergency radio signal, and upon receiving the emergency cancellation radio signal, the predetermined mobile station executes sending and receiving of radio signals to and from the base station, and concurrently functions as a mobile base station that executes sending and receiving of radio signals between the predetermined mobile station and the other mobile stations in the surroundings of the predetermined mobile station.

According to the radio communication system described above, in the event of the emergency, the base station sends, to the plurality of mobile stations, an emergency radio signal that contains emergency information indicating the occurrence of the emergency, and further sends, to predetermined one among the plurality of mobile stations, an emergency cancellation radio signal containing cancellation information, which at least partly cancels restriction of the radio communication with the predetermined mobile station, in addition to the emergency radio signal. Upon receiving the emergency cancellation radio signal, the predetermined mobile station executes sending and receiving of radio signals to and from the base station, and concurrently functions as a mobile base station that executes sending and receiving of radio signals between the predetermined mobile station and the other mobile stations in the surroundings of the predetermined mobile station. Therefore, even when line congestion has generated as an example of the predetermined condition after the occurrence of the emergency, the mobile stations other than the predetermined mobile station and present in the surroundings of the predetermined mobile station are able to perform the radio communication via the predetermined mobile station in a state in which the restriction of the radio communication is at least partly cancelled, although the radio communication with the base station is restricted. As a result, in the mobile stations other than the predetermined mobile station, communication can be performed for safety confirmation, risk avoidance, dispatch of information, etc. after the occurrence of the emergency, and high convenience can be ensured.

Preferably, the cancellation information contains time information specifying a time during which the restriction of the radio communication performed by the predetermined mobile station is at least partly cancelled, and the predetermined mobile station functions as the mobile base station for the time specified in the time information.

According to the radio communication system described above, the cancellation information contains time information specifying a time during which the restriction of the radio communication performed by the predetermined mobile station is at least partly cancelled, and the predetermined mobile station functions as the mobile base station for the time specified in the time information. Therefore, even when line congestion has generated as an example of the predetermined condition, the mobile stations other than the predetermined mobile station and present in the surroundings of the predetermined mobile station are able to perform the radio communication for the predetermined time via the predetermined mobile station in a state in which the restriction of the radio communication is at least partly cancelled, although the radio communication with the base station is restricted. As a result, in comparison with the case that the mobile stations other than the predetermined mobile station perform communication unlimitedly after the occurrence of the emergency, a connection disable state can be suppressed from continuing for a long time, and convenience can be further improved.

Preferably, the base station sends both the emergency radio signal and the emergency cancellation radio signal, as one signal (SIB10 signal or SIB11 signal), to the predetermined mobile station.

According to the radio communication system described above, since the base station sends both the emergency radio signal and the emergency cancellation radio signal, as one signal, to the predetermined mobile station, a probability that those signals are received by the predetermined mobile station can be increased, and convenience can be further improved.

Preferably, the predetermined mobile station may be mounted on a vehicle.

According to the radio communication system described above, since the predetermined mobile station is mounted on a vehicle, the larger number of predetermined mobile station can be secured in a distributed state within a region where the emergency has occurred, and convenience can be further improved.

Preferably, the predetermined condition may be congestion in the radio communication between the base station and the plurality of mobile stations.

According to the radio communication system described above, even when the emergency has occurred and congestion has generated in the radio communication, the above-described advantageous effects can be obtained.

BRIEF DESCRIPTION OF THE DRAWINGS

The advantages of the disclosure will become apparent in the following description taken in conjunction with the following drawings.

DETAILED DESCRIPTION

Figure 1:
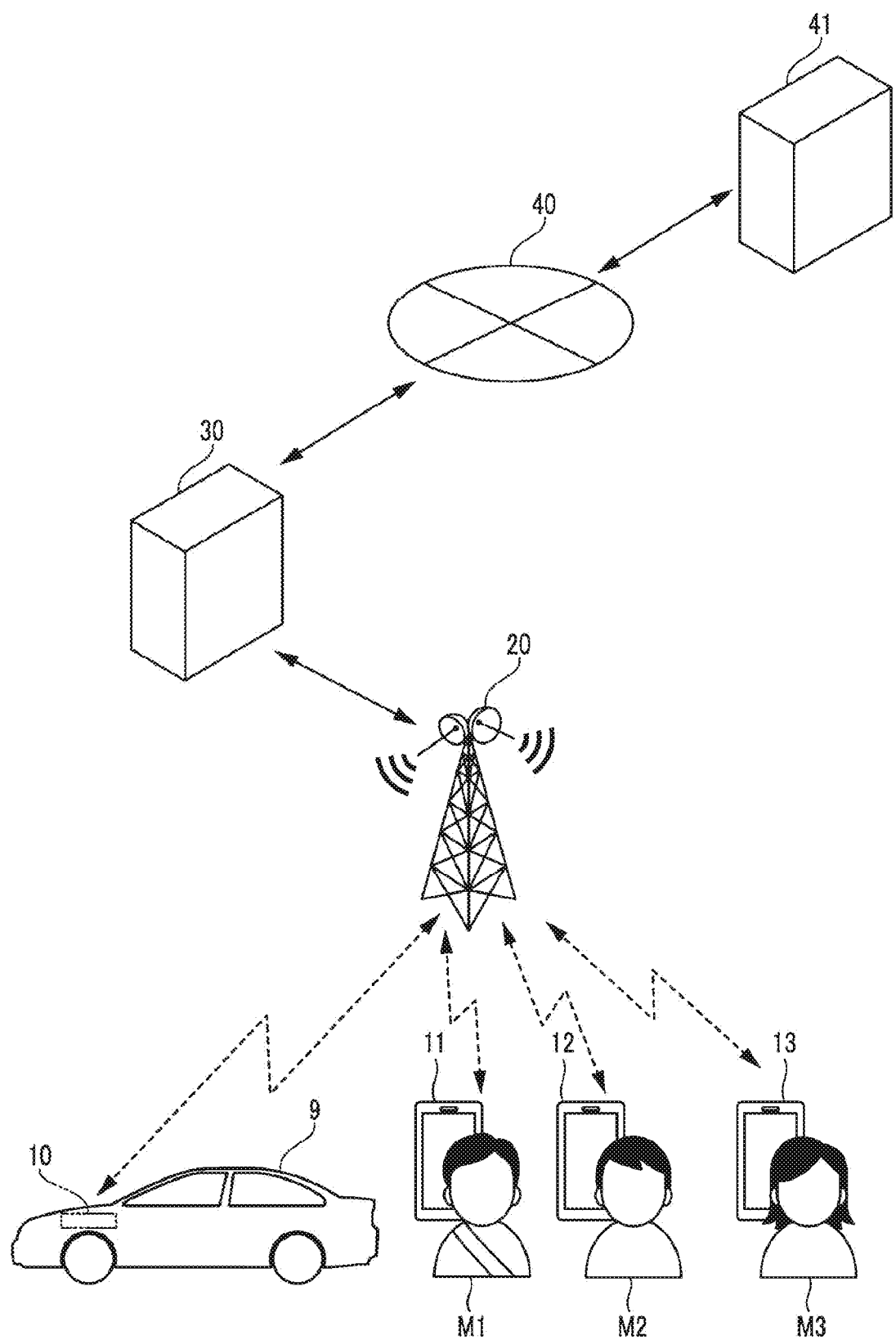
FIG. 1 illustrates a configuration of a radio communication system according to an embodiment of the present disclosure.

A radio communication system 1 according to an embodiment of the present disclosure will be described below with reference to the drawings. The radio communication system 1 according to this embodiment, illustrated in FIG. 1, is a high-speed radio communication system in conformity with a predetermined standard (e.g., a 5G (fifth generation) mobile communication system). The radio communication system 1 includes mobile stations (UE) 10 to 13, many base stations (eNBs) 20 (only one of which is illustrated), many Mobility Management Entities (MMEs) 30 (only one of which is illustrated), etc.

The mobile station 10 is mounted on a vehicle 9 and performs, as described later, radio communication with each base station 20 in accordance with the Radio Resource Control (RRC) protocol.

The mobile stations 11 to 13 are each of mobile information terminal type. The mobile station 11 is carried by a politician M1, and the mobile stations 12 and 13 are carried respectively by a general man M2 and a general woman M3. Those mobile stations 11 to 13 also perform radio communication with each base station 20 in accordance with the RRC protocol.

On the other hand, the plurality of base stations 20 are connected to each Mobility Management Entity 30 and perform data communication in accordance with a predetermined communication protocol (e.g., TCP/IP protocol or IP protocol). The Mobility Management Entity 30 is further connected to an operation server 41 on the administrative side via a network 40.

Figure 2:
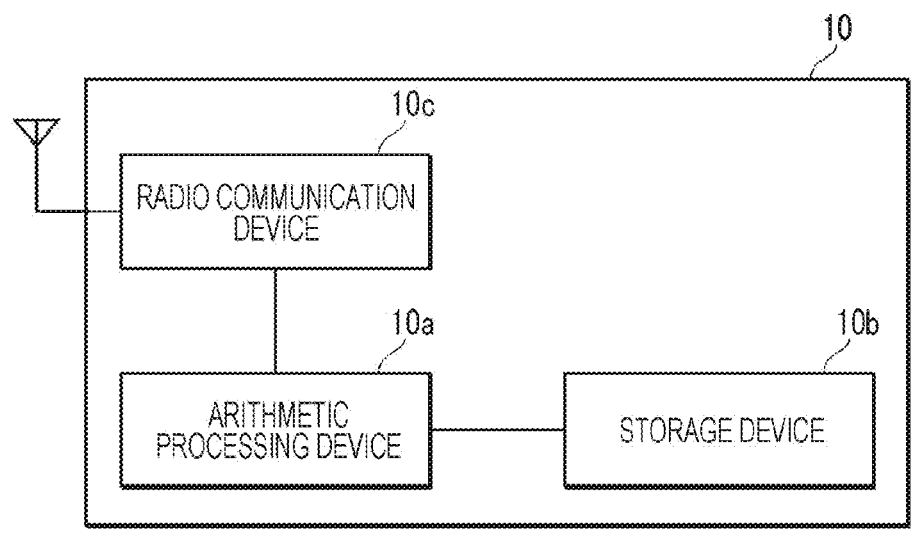
FIG. 2 is a block diagram illustrating an electrical configuration of a mobile station.

A configuration of the mobile station 10 will be described below with reference to FIG. 2. As illustrated in FIG. 2, the mobile station 10 includes an arithmetic processing device 10*a*, a storage device 10*b*, a radio communication device 10*c*, etc. The arithmetic processing device 10*a* is constituted by a CPU, etc. In an ordinary situation, the arithmetic processing device 10*a* executes a radio communication control process of sending and receiving communication data signals to and from the base station 20 in accordance with the RRC protocol. In the event of a large-scale disaster such as an earthquake or a tsunami, the arithmetic processing device 10*a* executes, as described later, a radio communication control process to operate as a mobile base station (Moving Cell).

The storage device 10*b* is constituted by RAM, ROM, E2PROM or the like, and it stores various data calculated by the arithmetic processing device 10*a*, data sent to and received from the base station 20, etc. The radio communication device 10*c* is constituted by a radio circuit including a modem chip that is able to perform radio communication in accordance with the RRC protocol, etc.

Though not illustrated, each of the other mobile stations 11 to 13 includes an arithmetic processing device, a storage device, a radio communication device, etc. as in an ordinary mobile information terminal.

Figure 3:
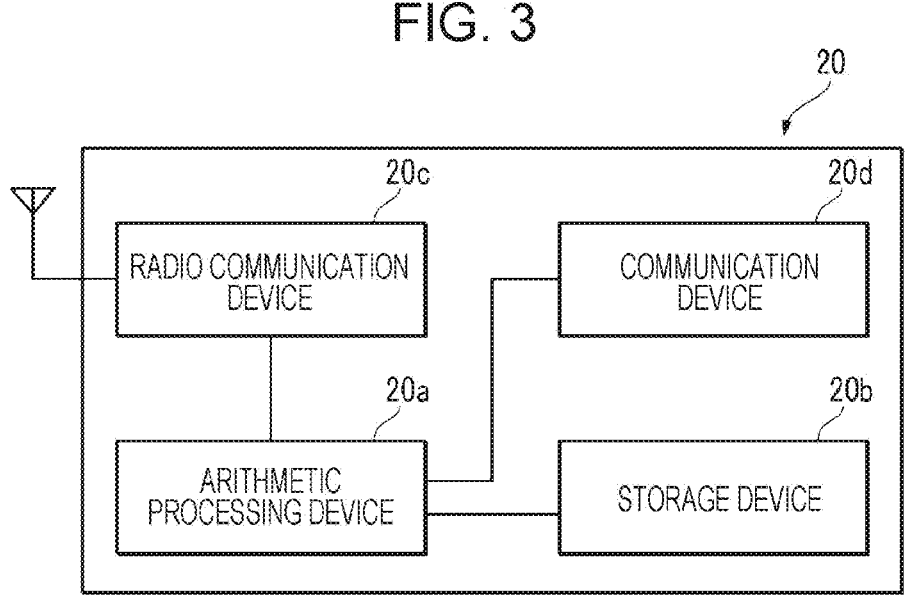
FIG. 3 is a block diagram illustrating an electrical configuration of a base station.

A configuration of the base station 20 will be described below with reference to FIG. 3. As illustrated in FIG. 3, the base station 20 includes an arithmetic processing device 20*a*, a storage device 20*b*, a radio communication device 20*c*, a communication device 20*d*, etc.

The arithmetic processing device 20*a* is constituted by a CPU, etc. In an ordinary situation, the arithmetic processing device 20a executes a radio communication control process of sending and receiving communication data signals to and from the mobile stations 10 to 13 via the radio communication device 20c in accordance with the RRC protocol.

In the event of a large-scale disaster, the arithmetic processing device 20a executes, as described later, a radio communication control process of sending an SIB10 signal (System Information Block type 10) and an SIB11 signal (System Information Block type 11) to the mobile stations 10 to 13. In this case, the SIB10 signal and the SIB11 signal sent to the mobile station 10 are given as containing later-described mobile-station high priority assignment information (also called "establishmentcause: high priority access") in addition to the SIB10 signal and the SIB11 signal that are sent to the mobile stations 11 to 13. Furthermore, the arithmetic processing device 20a executes, as described later, a radio communication control process of controlling the mobile station 10 to operate as the mobile base station.

Moreover, the arithmetic processing device 20a executes data communication with the Mobility Management Entity 30 via the communication device 20d in accordance with the above-described predetermined communication protocol.

The storage device 20b is constituted by RAM, ROM, E2PROM or the like, and it stores various data contained in communication data signals received from both the mobile station 10 and the Mobility Management Entity 30.

The radio communication device 20c is constituted by a radio circuit including a modem chip that is able to perform radio communication in accordance with the RRC protocol. The communication device 20d is constituted by a communication circuit that is able to perform data communication in accordance with the above-described predetermined communication protocol.

Figure 4:
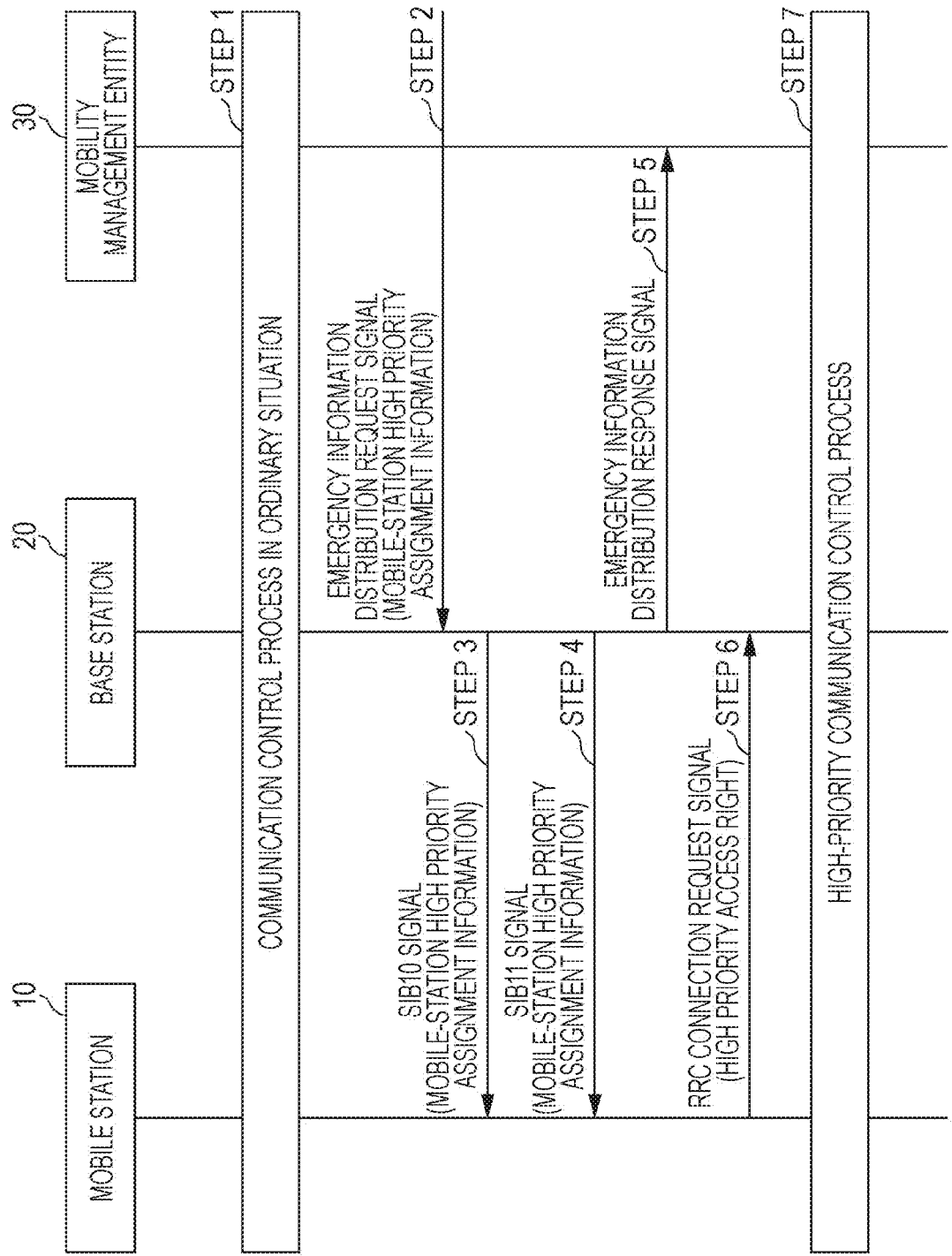
FIG. 4 is a chart illustrating an example of communication operation in the event of a large-scale disaster.

The communication operation executed by the radio communication system 1 according to this embodiment will be described below with reference to FIG. 4. As illustrated in FIG. 4, when a large-scale disaster occurs in a state in which a communication control process in an ordinary situation (FIG. 4/STEP 1) is executed among the mobile station 10, the base station 20, and the Mobility Management Entity 30, an emergency information distribution request signal (Write-Replace Warning Request) containing the mobile-station high priority assignment information is sent to the base station 20 from the operation server 41 on the administrative side via the Mobility Management Entity 30 (FIG. 4/STEP 2).

The mobile-station high priority assignment information is to give the same priority order as that of the high-priority mobile station to the mobile station 10 for a predetermined time (e.g., 30 minutes), and it contains time information representing the predetermined time. Stated in another way, the mobile-station high priority assignment information is intended to keep the mobile station 10 in a state being able to perform radio communication with the base station 20 for the predetermined time without undergoing restriction of communication even when line congestion generates after the occurrence of a large-scale disaster.

Upon receiving the emergency information distribution request signal, the base station 20 sends the SIB10 signal (FIG. 4/STEP 3). The SIB10 signal sent to the mobile station 10 contains not only first notification information (emergency information) indicating a disaster type, but also the above-described mobile-station high priority assignment information.

Then, the base station 20 sends the SIB11 signal (FIG. 4/STEP 4). The SIB11 signal contains not only second notification information, i.e., message information representing situations of the disaster, but also the above-described mobile-station high priority assignment information. In this embodiment, the SIB10 signal and the SIB11 signal correspond respectively to an emergency radio signal and an emergency cancellation radio signal, and the mobile-station high priority assignment information corresponds to cancellation information.

Thereafter, an emergency information distribution response signal (Write-Replace Warning Response) is sent from the base station 20 to the Mobility Management Entity 30 (FIG. 4/STEP 5). The emergency information distribution response signal is a signal indicating that the base station 20 has executed distribution of the emergency information.

Then, an RRC connection request signal (Radio Resource Control Connection Request) containing high-priority access right information is sent from the mobile station 10 to the base station 20 (FIG. 4/STEP 6). The high-priority access right information represents that the mobile station 10 has access right of accessing the base station 20 with the same priority order as that of the high-priority mobile station.

With the execution of the above-described communication operation, a high-priority communication control process is executed among the mobile station 10, the base station 20, and the Mobility Management Entity 30 (FIG. 4/STEP 7). The execution of the high-priority communication control process enables the mobile station 10 to function as the mobile base station for the predetermined time in the event of a large-scale disaster such as an earthquake or a tsunami.

Because, as described above, the mobile station 10 is allowed to function as the mobile base station for the predetermined time with the execution of the above-described high-priority communication control process in the event of a large-scale disaster such as an earthquake or a tsunami, the radio communication system 1 according to this embodiment can provide the following advantageous effects.

Figure 6:
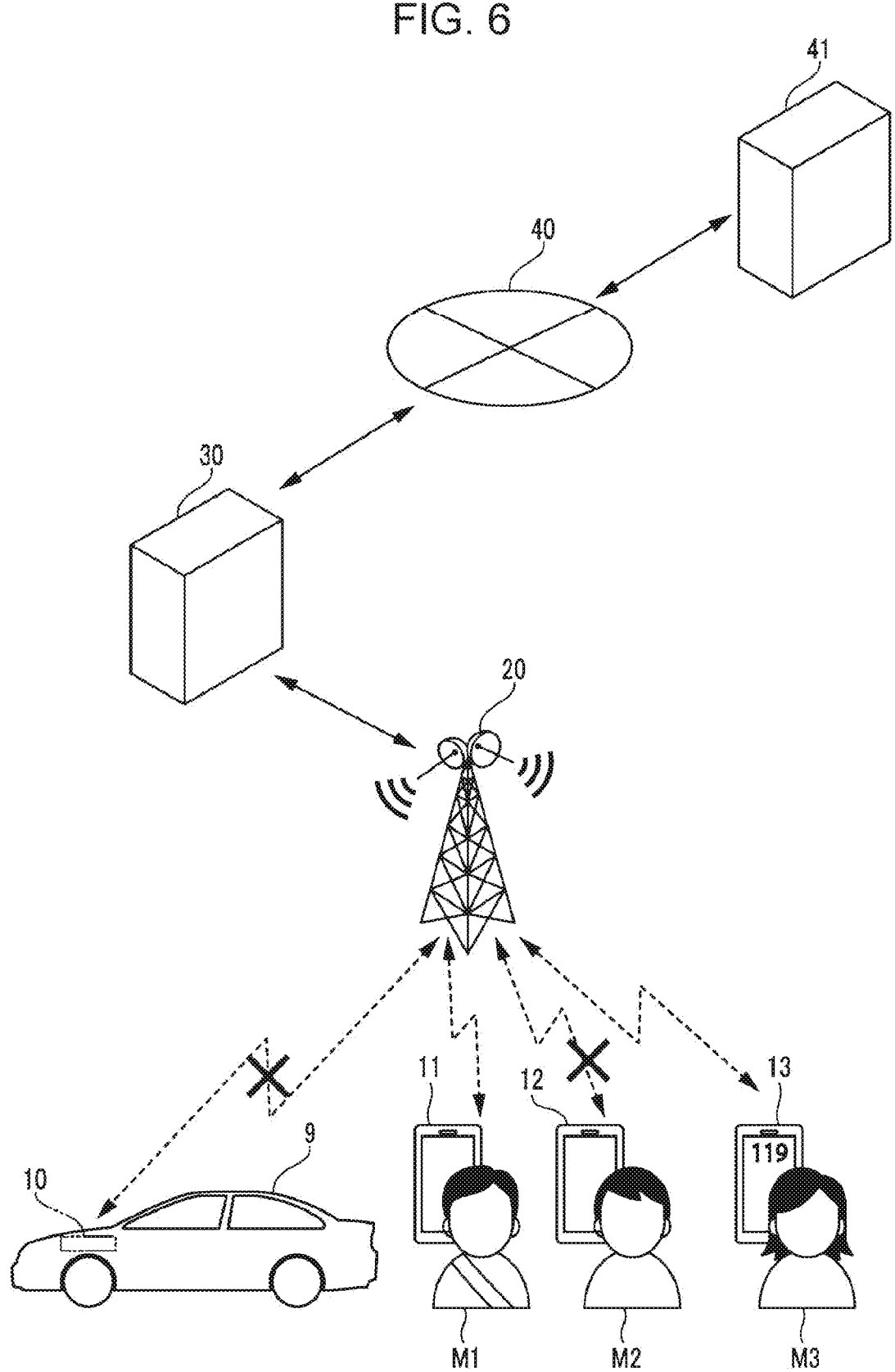
FIG. 6 illustrates a communication state using a radio communication system of related art in the event of a large-scale disaster.

In a radio communication system of related art, as illustrated in FIG. 6, when line congestion (predetermined condition) generates after the occurrence of a large-scale disaster such as an earthquake or a tsunami, the general mobile stations 10, 12 and 13 are brought into a state in which communication with the base station 20 except for emergency calls such as calls to fire and police stations, etc. is restricted.

Figure 5:
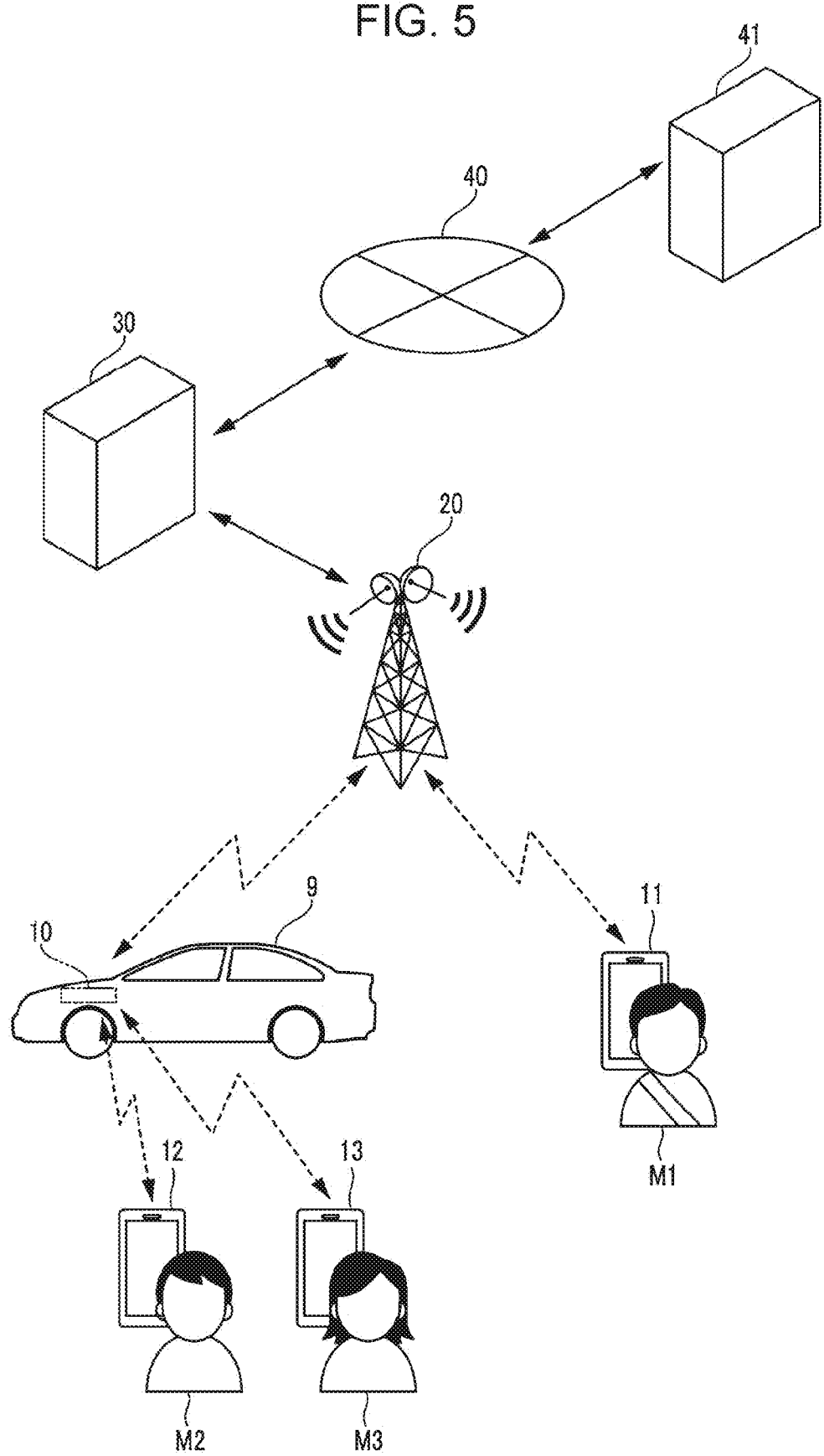
FIG. 5 illustrates a communication state using the radio communication system according to the embodiment in the event of a large-scale disaster.

In contrast, with the radio communication system 1 according to this embodiment, in the event of line congestion after the occurrence of a large-scale disaster, the general mobile stations 12 and 13, which are present in the surroundings of the mobile station 10, come into the state capable of performing communication with the base station 20 and the Mobility Management Entity 30 for the predetermined time via the mobile station 10 functioning as the mobile base station, as illustrated in FIG. 5, even when those mobile stations 12 and 13 are restricted in communication with the base station 20 and are brought into a state incapable of performing radio communication with the base station 20.

As a result, the persons M2 and M3 carrying the mobile stations 12 and 13 can perform, via the mobile station 10, communication for safety confirmation, risk avoidance, dispatch of information, etc. after the occurrence of an emergency, and can ensure high convenience.

Under the condition that the mobile station 10 functions as the mobile base station, a call connection rate in the entirety of the radio communication system 1 comes into a considerably-reduced state with a high possibility. With the radio communication system 1 according to this embodiment, however, since the time during which the mobile station 10 functions as the mobile base station is limited to the predetermined time, the state of the call connection rate being considerably lower than in the ordinary situation can be suppressed from continuing for a long time, and high convenience can be ensured.

While the embodiment represents the example in which the occurrence of a large-scale disaster such as an earthquake or a tsunami is assumed to be the occurrence of an emergency, the occurrence of an emergency is not limited to such a case, and the occurrence of incidents between nations, etc. may be assumed to be the occurrence of an emergency.

Furthermore, while the embodiment represents the example in which the restriction of radio communication with the base station 20 is cancelled by giving the same priority order as that given to the high-priority mobile station to the mobile station 10, i.e., the predetermined mobile station, in the event of an emergency, the restriction of radio communication may be cancelled partly. For instance, a total number of call connections between the mobile station 10 and the base station 20 may be limited to be kept at a predetermined limit value or less.

Moreover, while the embodiment represents the example in which the mobile station 10 mounted on the vehicle is used as the predetermined mobile station, the predetermined mobile station in the present disclosure is not limited to that case, and the predetermined mobile station may be of any type insofar as it functions as a mobile base station capable of sending and receiving radio signals between the predetermined mobile station and the other mobile stations in the surroundings of the predetermined mobile station. For instance, a mobile information terminal may be used as the predetermined mobile station.

While the embodiment represents the example in which both of the SIB10 signal and the SIB11 signal contain the mobile-station high priority assignment information, either one of those signals may contain the mobile-station high priority assignment information. Alternatively, another emergency cancellation radio signal being different from the SIB10 signal and the SIB11 signal and containing the mobile-station high priority assignment information may be sent from the base station 20 to the mobile station 10.

While the embodiment represents the example in which line congestion is assumed to be the predetermined condition, the predetermined condition in the present disclosure is not limited to that case, and a failed condition or a power-reduced condition of the radio communication system may be assumed to be the predetermined condition. Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

What is claimed is:

1. A radio communication system comprising:
a base station; and
a plurality of mobile stations, the radio communication system operating such that radio signals are sent and received between the base station and the plurality of mobile stations in an ordinary situation, and that, when an emergency has occurred and a predetermined condition has generated, radio communication between the base station and the plurality of mobile stations is more restricted than in the ordinary situation, wherein, in the event of occurrence of the emergency, the base station sends, to the plurality of mobile stations, an emergency radio signal that contains emergency information indicating the occurrence of the emergency, and further sends, to at least one of the plurality of mobile stations, an emergency cancellation radio signal containing cancellation information, which at least partly cancels restriction of the radio communication with the at least one of the mobile stations, in addition to the emergency radio signal, and upon receiving the emergency cancellation radio signal, the at least one of the mobile stations executes sending and receiving of radio signals to and from the base station, and concurrently functions as a mobile base station that executes sending and receiving of radio signals with another of the mobile stations located in surroundings of the at least one of the mobile stations, wherein the cancellation information contains time information specifying a time during which the restriction to the radio communication performed by the at least one of the mobile stations is at least partly cancelled, and the at least one of the mobile stations functions as the mobile base station for the time specified in the time information.

2. The radio communication system according to claim 1, wherein the base station sends both the emergency radio signal and the emergency cancellation radio signal, as one signal, to the at least one of the mobile stations.

3. The radio communication system according to claim 1, wherein the at least one of the mobile stations is mounted on a vehicle.

4. The radio communication system according to claim 1, wherein the predetermined condition is line congestion in the radio communication between the base station and the plurality of mobile stations.

5. The radio communication system according to claim 1, wherein upon receiving the emergency cancellation radio signal, the at least one of the mobile stations enables sending and receiving of the radio signals between the base station and the another of the mobile stations via the at least one of the mobile stations.

6. A communication method for a radio communication system which comprises a base station; and a plurality of mobile stations, the radio communication system operating such that radio signals are sent and received between the base station and the plurality of mobile stations in an ordinary situation, and that, when an emergency has occurred and a predetermined condition has generated, radio communication between the base station and the plurality of mobile stations is more restricted than in the ordinary situation, the method comprising the steps of:
in the event of occurrence of the emergency, receiving, by at least one of the mobile stations, from the base station an emergency radio signal that contains emergency information indicating the occurrence of the emergency, and an emergency cancellation radio signal containing cancellation information which at least partly cancels restriction of the radio communication; and upon receiving the emergency cancellation radio signal, executing, by the at least one of the mobile stations, sending and receiving of radio signals to and from the base station, and the at least one of the mobile stations concurrently functioning as a mobile base station that executes sending and receiving of radio signals with another of the mobile stations located in surroundings of the at least one of the mobile stations, wherein the cancellation information contains time information specifying a time during which the restriction to the radio communication performed by the at least one of the mobile stations is at least partly cancelled, and the at least one of the mobile stations functions as the mobile base station for the time specified in the time information.

\* \* \* \* \*